United States Patent [19]

Factor et al.

[11] 4,126,740

[45] Nov. 21, 1978

[54] ORGANOPOLYSILOXANE-POLYCARBONATE COPOLYMERS

[75] Inventors: Arnold Factor, Scotia, N.Y.; Keith N. Sannes, Mt. Vernon, Ind.

[73] Assignee: General Electric Company, Schenectady, N.Y.

[21] Appl. No.: 874,512

[22] Filed: Feb. 2, 1978

[51] Int. Cl.$^2$ ............................................. C08G 77/04
[52] U.S. Cl. .......................................... 528/29; 260/3; 260/13; 260/824 R; 260/826; 528/10; 528/12; 528/21; 528/43
[58] Field of Search .......... 260/46.5 R, 47 XA, 824 R

[56] References Cited

U.S. PATENT DOCUMENTS

| | | | |
|---|---|---|---|
| 3,821,325 | 6/1974 | Merritt, Jr. et al. | 260/824 R |
| 3,832,419 | 8/1974 | Merritt, Jr. | 260/46.5 R |

*Primary Examiner*—Melvyn I. Marquis
*Attorney, Agent, or Firm*—Joseph T. Cohen; Charles T. Watts

[57] ABSTRACT

Polymeric compositions containing organosiloxane units and carbonate units modified by the presence of halogenated organic radicals imparting improved flame retardancy, reduced smoke evolution, and non-drip characteristics are described. Such compositions can be heat-treated alone or in the presence of curing agents to form thermoset products.

6 Claims, No Drawings

ORGANOPOLYSILOXANE-POLYCARBONATE COPOLYMERS

The present invention relates to compositions containing organopolysiloxane units and polycarbonate units imparting to the organopolysiloxane improved flame retardancy and smoke inhibition. More particularly, the invention is concerned with a composition of matter corresponding to the general formula

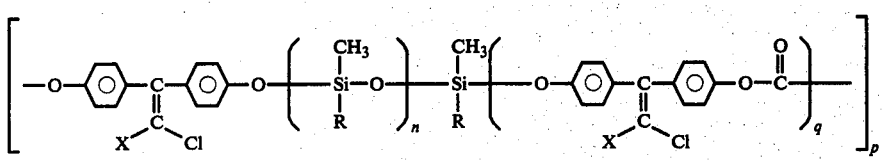

where X is a member selected from the class consisting of chlorine and hydrogen, R is a member selected from the class consisting of lower alkyl radicals of from 1 to 3 carbon atoms (e.g., methyl, ethyl, propyl, etc.) and the phenyl radical, n is a whole number equal to at least 1, e.g., from 1 to 1000 or more, p is a whole number greater than 1, for instance, from 2 to 10,000 or more, and q is a whole number equal to at least 1, e.g., from 1 to 200 or more.

Heat resistant silicone rubber compositions comprising an organopolysiloxane polymer derived from curing organopolysiloxane polymers having a viscosity of at least 50,000 centipoises at 25° C. of the formula $$R_aSiO_{(4-a)/2} \qquad (II)$$

where R has the meaning given above and "a" varies from 1.9 to 2.01 inclusive, have been extensively used in applications where heat resistance is an important requirement. Such organopolysiloxanes, however, suffer from the fact that the oxygen indices of such compositions are often high and the smoke evolved on burning such polymers often is excessive, thus limiting the use to which such organopolysiloxane polymers can be employed. Various additives have been incorporated in the organopolysiloxanes, but these add a foreign element to the polymeric composition and often require large amounts of expensive materials to accomplish the desired reduction in oxygen index and smoke evolution.

Unexpectedly, we have discovered that the presence of units of the formula

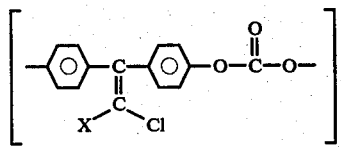

markedly decrease the oxygen index and at the same time reduce the smoke evolution (or smoke index as it is often referred to) of polymers containing these units.

Of particular value, as far as optimizing the oxygen index and the smoke index are concerned, are those block copolymers wherein there are present (a) from 10 to 75%, by weight, of a polydiorganosiloxane composed of from about 2 to 200 chemically combined diorganosiloxane units of the formula

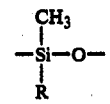

which are connected to each other by silicon-oxygen-silicon linkages and (b) from 90–25%, by weight, of an intercondensed unit of the formula

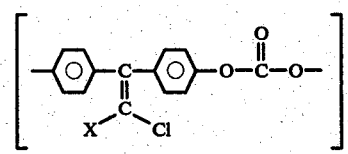

where R and X have the meanings given above and where said polydiorganosiloxane and said intercondensation unit are joined by phenoxy-silicon

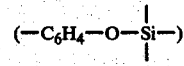

linkages.

In preparing these copolymers, one advantageously first prepares either separately or in situ, a dihydroxy terminated compound of the formula

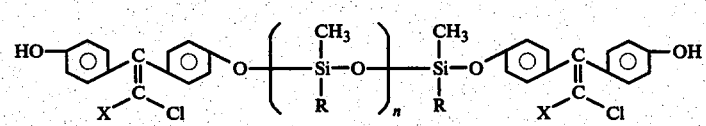

where X, R, and n have the meaning given above. such compounds of formula IV can be obtained by effecting reaction between a dihydric phenol (hereinafter so designated) of the formula

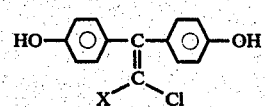

and a dichlorosiloxane (hereinafter so designated) compound of the formula

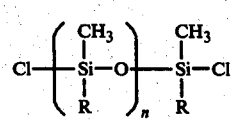

where X, R, and n have the meanings given above. In forming the compound of formula IV, at least 2 mols, e.g., from 2 to 40 or more mols, of the compound of formula V are used per mol of the dichlorosiloxane of formula VI. The reaction required to form the compound of formula IV is carried out at temperatures advantageously within the range of from 25°–150° C. and in the presence of a hydrohalide acceptor, such as pyridine, quinoline, tertiary amines such as tributyl amine, trimethyl amine, etc.

The dichlorosiloxane of formula VI can be made by well-known methods including the controlled hydrolysis of the appropriate diorganodihalosilane, for example, dimethyldichlorosilane or methyl phenyldichlorosilane, as more particularly described in Hyde patents U.S. Pat. Nos. 2,629,726 and 6,902,507 and in Patnode 2,381,366, the latter issued Aug. 7, 1945 and assigned to the same assignee as the present invention. Other means for preparing these chloropolysiloxanes well known in the art can be used and such methods, including the aforesaid Patnode patent, are intended to be incorporated and included within the scope of the disclosures of the instant invention. Preferably, the chlorinated polysiloxane is in the form of a chlorinated polydimethylsiloxane.

Among the dihydroxy compounds of formula V are 2,2-bis(p-hydroxyphenyl)-1,1-dichloroethylene having the formula

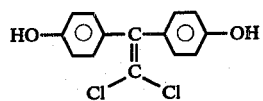
VII and 2,2-bis(p-hydroxyphenyl)-1-chloroethylene having the formula

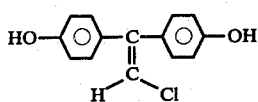
VIII

The presence of small amounts of dihydric compounds of the formula

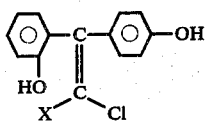

(due to the method of preparing compounds of formulas VII and VIII) is not precluded, where X has the meaning given above.

In forming the compounds of formula IV, suitable inert solvents such as chloroform, chlorobenzene, methylene chloride, tetrachloroethane, etc., may be employed as the medium in which to conduct the reaction in amounts ranging, on a weight basis, from about 1 to 10 parts or more of the solvent per part of the mixture of the dichlorosiloxane and the dihydric phenol. The amount of hydrohalide acceptor used should be adequate to remove all the formed HCl and will depend on the proportions of the reactants. Times of the order from about 10 minutes to about 3 or more hours are usually adequate for completion of the reaction to form the compound of formula IV. Anhydrous conditions are usually desirable for optimum results.

Thereafter, the compound of formula IV is subjected to a phosgenation reaction by passing phosgene into the solution of the formed compound of formula IV. During the phosgenation reaction, it is desirable to effect stirring of the mixture. The phosgenation is carried out until the resulting mixture by use of excess amounts of the phosgenating agent has attained the maximum viscosity, indicating that carbonation of the compound of formula IV has been attained. Usual means can be employed for recovering and purifying the block copolymers such as by the use of various solvents, by washing, filtration, etc. Additional directions for this phosgenation reaction can be found in Schnell et al patents U.S. Pat. Nos. 2,937,459 and 3,022,272, issued Aug. 22, 1961 and Feb. 20, 1962, respectively, whereby the dihydric compound of formula IV is employed in place of the bisphenol-A used in the aforesaid Schnell et al patents. By reference, these two patents are incorporated into the instant application.

In order that those skilled in the art may better understand how the present invention may be practiced, the following examples are given by way of illustration and not by way of limitation.

The oxygen index (OI) measurements were obtained in accordance with the methods described in U.S. Pat. Nos. 3,519,697 issued July 7, 1970, and 3,944,517 issued Mar. 16, 1976, which by reference are made part of the disclosures of the instant application. The percent char at 700° C. in nitrogen (and in air) was determined (see aforesaid U.S. 3,944,517) by the method described by J. A. Parker and E. L. Winkler in NASA Technical Report TR-276 (1967). Finally, the smoke index ($D_m$ corrected) was established (see aforesaid U.S. Pat. Nos. 3,944,517) pursuant to an article by Loftus et al, ASTM Special Technical Publication 422 (1969), where $D_m$ is the maximum specific optical density corrected for deposit on an optical window. All the foregoing tests, including the oxygen index, char tests, and smoke evolution test referred to above are incorporated by reference into the instant application.

The chlorine terminated polydimethylsiloxane employed in the following examples is prepared as follows: A mixture of 100 parts water and 206 parts of dioxane are added over a 2 hour period to 800 parts of dimethyldichlorosilane. The resulting mixture is stirred and heated to the reflux temperature of the mass until a homogeneous solution is obtained. By fractional distillation in vacuum to a temperature of about 202° C. at 12 mm pressure, one obtains a chlorineterminated siloxane having a calculated average formula

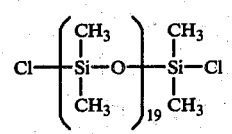
IX

EXAMPLE 1

400 ml dry methylene chloride (dried over activated 4A molecular sieves), 56 ml dry pyridine, and the requisite amount of the dihydric phenol of formula VII were added to a reactor and while maintaining a temperature of about 25°–30° C. (room temperature) the resulting solution was stirred for 15 minutes while at the same time bubbling nitrogen through the solution. Thereafter, a 400 ml methylene chloride solution of the requisite amount of the chlorine-terminated siloxane of formula IX was added dropwise over a period of about 20 minutes. The mixture was then allowed to react with stirring for an additional 30 minutes at ambient temperature (about 30°–40° C.) at which time there was present in the mixture the composition having the formula

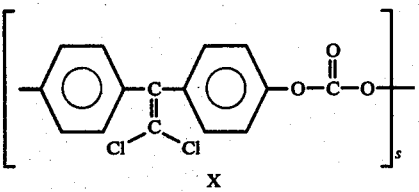

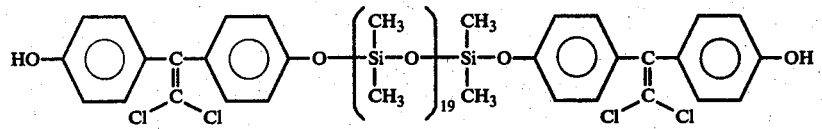

Thereafter, about 110 mol percent (per mol of the compound of formula VII) of phosgene was added to the mixture slowly for a period of about 20 minutes at which point the viscosity increased quite markedly. The resulting polymer was isolated from the solution by precipitating the total reaction solution with a sufficient amount of methanol to precipitate the polymer and thereafter purified by redissolving the polymer in 2 liters methylene chloride, washing it with 5% aqueous HCl, followed by a wash with water, and then drying the polymer solution with anhydrous magnesium sulfate. The filtered polymer solution was then further purified by reprecipitating the polymer from excess methanol. This resulted in a copolymeric composition having the formula

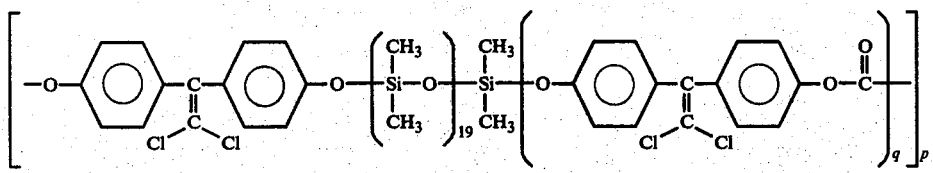

where $p$ and $q$ are independently whole numbers in excess of 1.

The above procedure was repeated almost identically in making a series of copolymers wherein the weight amounts of the dichloroethylene compound of formula VII and the chlorineterminated polydimethylsiloxanes of formula IX were varied. The following Table I shows the amounts of the reagents used to prepare various copolymeric compositions pursuant to the above prescribed general procedure. The copolymers contained units derived from the reactants is essentially the same weight ratio as the starting reactants from which the units were derived.

TABLE I

| Test No. | Wt. of Compound Formula VII | Wt. of Compound Formula IX |
|---|---|---|
| 1 | 90 grams | 10 grams |
| 2 | 75 grams | 25 grams |
| 3 | 50 grams | 50 grams |
| 4 | 36 grams | 64 grams |

The following Table II shows the properties of the various copolymers obtained in accordance with the preceding examples. For comparison, the properties of a 100% polycarbonate polymer made from the dichloroethylene compound of formula VII and having the formula are included for comparison of results, where $s$ is a whole number greater than 1.

TABLE II

| Test No. | OI | $D_m$ | $^c[\eta]$ | $^b$Tensile Break ($10^{-3}$ psi) | % Elongation | $^a$%Char. Air | $N_2$ |
|---|---|---|---|---|---|---|---|
| 100% Polycarbonate Formula XII | 56 | 66 | 0.54 | 8.5 | 79% | 2% | 54% |
| 1 | 61 | 20 | 0.34 | 8.0 | 72% | 7% | 54% |
| 2 | 49 | 60 | 0.36 | 6.4 | 76% | 10% | 54% |
| 3 | 35 | 187 | 0.75 | 3.1 | 284% | 30% | 58% |
| 4 | 34 | 180 | 0.81 | 1.4 | 744% | 36% | 58% |

$^a$Wt. percent residue at 700° C. All the polymers showed no drip characteristics as a result of carrying out the smoke test.
$^b$Values obtainable from cast films.
$^c$Measured in $CH_2Cl_2$ at 25° C.

It will be noted from an examination of Table II that the presence of 10 wt. percent of the dimethylsiloxy moiety gave material with significantly increased oxygen index and diminished smoke number ($D_m$-specific maximum optical smoke density) as determined using a National Bureau of Standards smoke chamber under flaming conditions. While increases in the oxygen index with siloxane content have previously been observed for some compositions but not all, the fact that such a low value of smoke index could be obtained with some of the copolymers herein described was unexpected and in no way could have been predicted. It will also be noted that as the siloxane content of the copolymer was increased, the rubbery characteristic (for example, the percent elongation) of the material also increased, making it especially useful in applications requiring flame retardant rubber, e.g., for uses in gasketing, flame retardant cable insulation, flame retardant impact modifiers for plastics, etc.

As additional comparison of the advantages of using the dichloroethylene compound of formula VII, so that there are present recurring units of the formula XII, the following table shows the effect of making copolymers as is more particularly described in U.S. Pat. Nos. 3,419,634 and 3,419,635, both issued Dec. 31, 1968 in the name of Howard A. Vaugh, wherein bisphenol-A having the formula

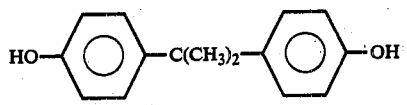
XIII was used in place of the dichloromonomer of formula VII. The following Table III shows the results of having copolymers in which the polycarbonate (derived from the compound of formula XIII) and siloxane moieties are varied:

TABLE III

| [a]Wt. % Bisphenol-A Moiety | Wt. % $(CH_3)_2SiO$ Moiety | Oxygen Index | $D_m$ |
|---|---|---|---|
| 100% | 0% | 27 | 165 |
| 75% | 25% | 33 | 260 |
| 57% | 43% | 31 | 500 |
| 51% | 49% | 28 | greater than 115[b] |

[a]Resulting in units of the formula

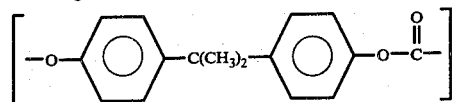

[b]Due to excess dripping the actual value could not be determined.

EXAMPLE 2

In this example, copolymeric compositions similar to those described in Example 1 are prepared employing the same conditions of reaction as in Example 1 with the exception that instead of using the dihydric phenol of formula VII, the 2,2-bis(p-hydroxyphenyl)-1-chloroethylene of formula VIII is used. As a result of carrying out this reaction, there is obtained initially the dihydroxy precursor having the formula

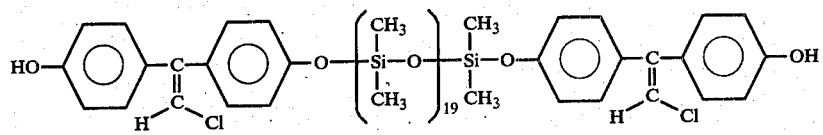
XIV which upon phosgenation in the manner described in Example 1, yields a polymer of the formula

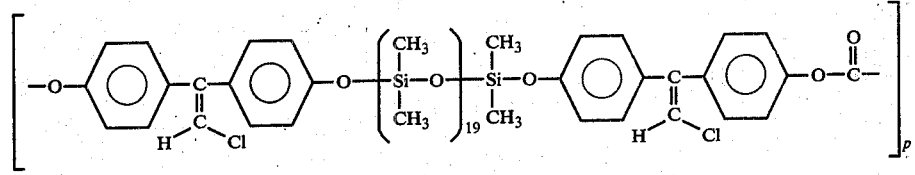
XV where $p$ is a whole number greater than 1. This polymer will also be found to have a good oxygen index and low smoke evolution.

It will of course be apparent to those skilled in the art that in addition to the chlorine terminated polysiloxanes mentioned above, other chlorine terminated polysiloxanes included within the scope of formula VI may be employed without departing from the scope of the invention. Additionally, the conditions of reaction can be varied widely and no critical problems are anticipated in observing the requirements of reaction as will be apparent to those skilled in the art.

Compositions of the present invention have application in a wide variety of physical shapes and forms, including the use of films, molding compounds, coatings, etc. When used as films or when made into molded products, these polymers, including laminated products prepared therefrom, not only possess good physical properties at room temperature but they retain their strength and excellent response to workloading at elevated temperatures for long periods of time. Films formed from the polymeric compositions of this invention may be used in application where films have been used previously. Thus, the compositions of the present invention can be used in automobile and aviation applications for decorative and protective purposes, and as high temperature electrical insulation for motor slot liners, in transformers, as dielectric capacitors, as coil and cable wrappings (form wound coil insulation for motors), for containers and container linings, in laminating structures where films of the present composition or where solutions of the claimed compositions of matter are applied to various heat-resistant or other type of materials such as asbestos, mica, glass fiber and the like and superposing the sheets one upon the other and thereafter subjecting them to elevated temperatures and pressures to effect flow and cure of the resinous binder to yield cohesive laminated structures. Films made from these compositions of matter can also serve in printed circuit applications.

Alternatively, solutions of the compositions herein described can be coated on electrical conductors such as copper, aluminum, etc., and thereafter the coated conductor can be heated at elevated temperatures to remove the solvent and to effect curing of the resinous composition thereon. If desired, an additional overcoat may be applied to such insulated conductors including the use of polymeric coatings, such as polyamides, polyesters, silicones, polyvinylformal resins, epoxy resins, polyimides, polytetrafluoro-ethylene, etc. The use of the curable compositions of the present invention as overcoats on other types of insulation is not precluded.

Applications which recommended these resins include their use as binders for asbestos fibers, carbon fibers, and other fibrous materials in making brakelinings. In addition, molding compositions and molded articles may be formed from the polymeric compositions in this invention by incorporating fillers such as asbestos, glass fibers, talc, quartz, powder, wood flour, finely divided carbon, silica, into such compositions prior to molding. Shaped articles are formed under heat, or under heat and pressure in accordance with practices well known in the art. In addition, various heat-resistant pigments and dyes may be incorporated as well as various types of inhibitors depending on the application intended.

The compositions herein defined may be suitably incorporated with other materials to modify the properties of the latter or in turn they may be modified by the incorporation of the materials, for example, they may be compounded with substances such as natural or synthetic rubbers, synthetic resins such as phenolaldehyde resins, alkyd resins, etc.; cellulosic materials such as paper, organic esters of cellulose such as cellulose acetate, cellulose ether; etc. Because of the favorable oxygen index and low smoke index, the incorporation of these polymers in other polymers which may not be so favorably disposed, for instance, other types of polycarbonate resins, polyphenylene oxide resins, polybutylene terephalate resins, etc., in amounts ranging from 5 to 75 percent, by weight, based on the total weight of the compositions herein described and the aforesaid resins, can improve the properties of the resins in which the copolymer compositions of the present invention are incorporated.

The compositions herein described are generally of a thermoplastic nature. However, they may be made thermoset by heating at elevated temperature of about 185–250° C. Alternatively, the conversion to the thermoset stage can be carried out more rapidly and at lower temperatures, for instance, 125–175° C., by incorporating certain cure accelerators, such as organic peroxides, e.g., benzoyl peroxide, dicumyl peroxide, tertiary butyl hydroperoxide, etc. As a result of conversion to the thermoset stage, particularly in copolymeric compositions having reinforcing fillers incorporated therein, molded products can be obtained which have increased tensile strengths. The introduction of vinyl siloxy units, e.g.,

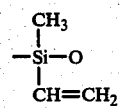

units, will further contribute to improvements in obtaining cross-linked products.

What we claim as new and desire to secure by Letters Patent of the United States is:

1. A composition of matter comprising units of the general formula

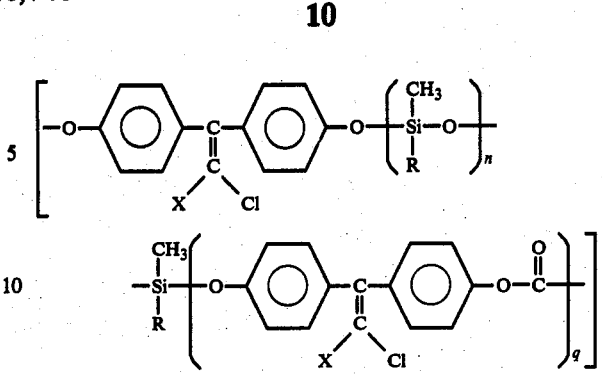

where X is a member selected from the class consisting of chlorine and hydrogen, R is a member selected from the class consisting of lower alkyl radicals of from 1 to 3 carbon atoms and the phenyl radical, and $n$ and $q$ independently are whole numbers equal to at least 1.

2. A composition of matter comprising units of the formula

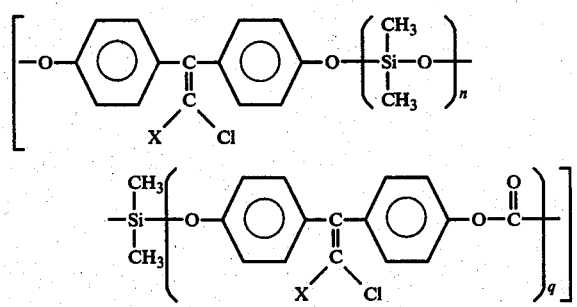

where X is a member selected from the class consisting of chlorine and hydrogen, and $n$ and $q$ independently are whole numbers equal to at least 1.

3. A composition of matter comprising units of the formula

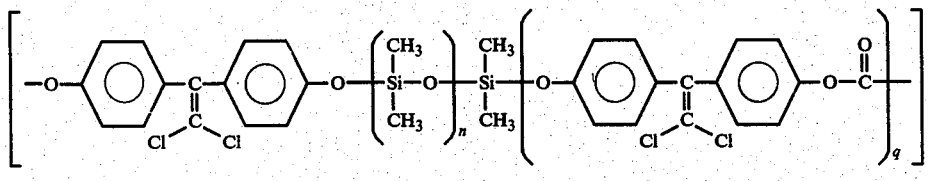

where $n$ and $q$ independently are whole numbers equal to at least 1.

4. A composition of matter comprising units of the formula

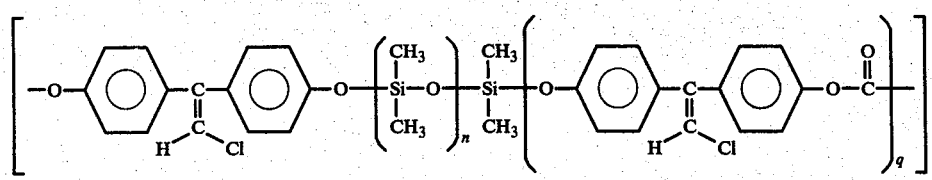

where $n$ and $q$ independently are whole numbers equal to at least 1.

5. A composition of matter comprising units of the formula

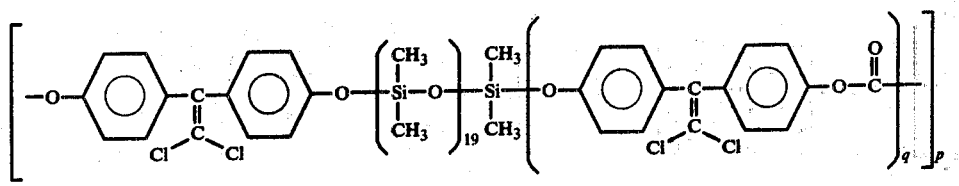
where *p* and *q* independently are whole numbers equal to or in excess of 1.
6. A composition of matter comprising units of the formula
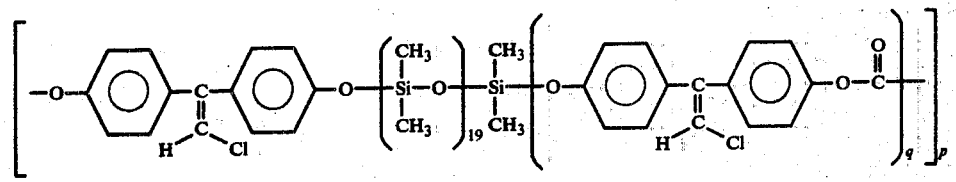
where *p* and *q* independently are whole numbers equal to or in excess of 1.
* * * * *